Nov. 11, 1958 V. C. WRIGHTSON ET AL 2,859,600
COUPLING
Filed March 17, 1955
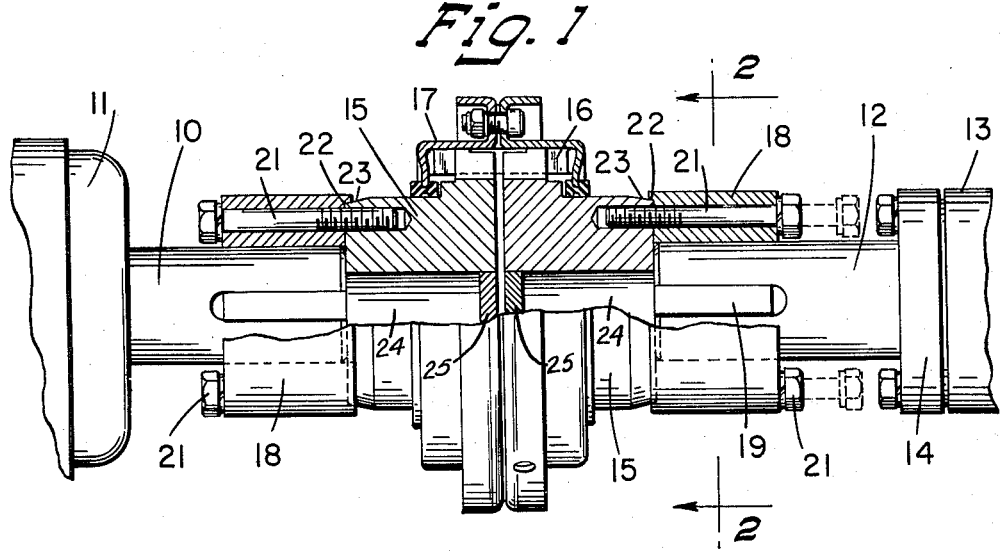
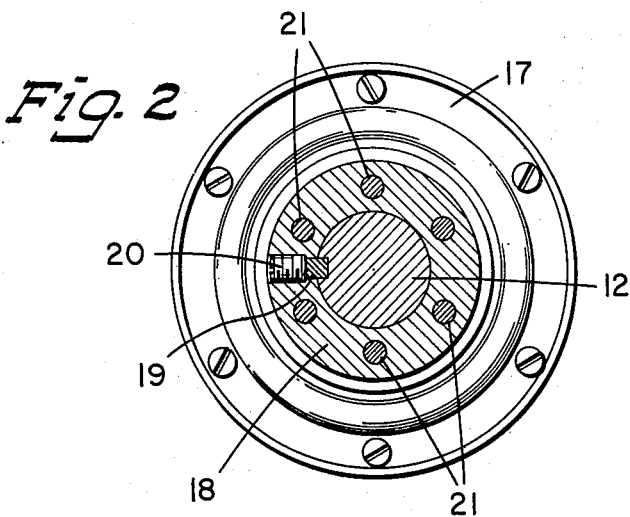
INVENTORS
Vic C. Wrightson and
BY Emil F. Stern.
*Attorney*

United States Patent Office 2,859,600
Patented Nov. 11, 1958

2,859,600

COUPLING

Vic C. Wrightson and Emil F. Stern, Milwaukee, Wis., assignors to The Falk Corporation, Milwaukee, Wis., a corporation of Wisconsin Application March 17, 1955, Serial No. 494,901

1 Claim. (Cl. 64—15)

This invention relates to flexible couplings for use as a power transmitting medium between driving and driven mechanisms.

One object of the present invention is to provide a flexible coupling capable of ready removal in such manner as to clear the end of a coupled shaft for the ready withdrawal and replacement thereover of shaft seals or other encircling mechanical parts. Such a coupling has particular utility when employed with some types of pumps and other equipment requiring replacement of shaft seals from time to time in order to maintain high operating efficiency.

Other objects and advantages will appear, expressed or implied, from the following description of a coupling embodying the present invention.

In the accompanying drawing:

Figure 1 is an elevational view, partly in section, of a coupling constructed and arranged in accordance with the present invention.

Fig. 2 is a transverse sectional view taken along the line 2—2 of Fig. 1.

The coupling shown provides a flexible power transmitting connection between the armature shaft 10 of a driving motor 11 and the input shaft 12 of a driven machine 13, such as a pump, having a shaft seal 14 requiring replacement from time to time.

In this instance the coupling comprises a pair of aligned, axially spaced, driving and driven hub members 15 flexibly interconnected by a resilient grid-like member 16 engaged in aligned slots provided in the peripheries of both members 15 in a manner well known in the art. An annular housing 17 encircling the grid-like member and the slotted portions of the hub members provides a lubricant retaining enclosure therefor.

The shafts 10 and 12 are shown axially spaced to permit positioning both coupling hub members 15 therebetween, each of the latter being detachably fixed to one of the shafts through a collar 18 thereon. In this instance each collar 18 is shown removably secured to one of the shafts through a key 19 locked in place by a set screw 20; and a set of cap-screws 21 extending through each collar are threaded into the adjacent hub 15 to secure the collar thereto. The inner end 22 of each collar is preferably counter-bored to provide a close fit with the machined end 23 of the adjacent hub 15, to register and accurately align the latter with the collar and with the connected shaft upon tightening the cap-screws 21.

It will be noted that the coupling may be applied or withdrawn, as a unit, to or from the shafts 10 and 12 without disturbing either of them, and that, when withdrawn, either or both of the collars 18 may be removed to clear the ends of the shafts for ready servicing. That is to say, upon removal of the coupling, the end of shaft 12 may be cleared by removal of the collar 18, thereby rendering the seal 14 readily withdrawable for inspection, replacement or repair.

The axial spacing between the coupling hubs 15 is preferably such as to permit sufficient axial adjustment thereof to clear the counter-bored ends 22 of the collars 18 during application and withdrawal of the coupling.

The fact that the coupling remains intact during application and removal thereof to and from the shafts is important, not only because of the saving of time heretofore necessarily consumed in dismantling and reassembling the coupling, but also because of the loss of lubricant heretofore involved in such operations and the necessity for replenishing the same.

In couplings of this type, heretofore used, the hubs 15 are commonly equipped with shaft receiving bores 24. In this instance the bores 24 are closed by suitable plugs 25 to render the hubs imperforate so as to avoid loss of lubricant therethrough. When thus constructed for mounting in the manner above described the coupling may be supplied at the place of manufacture with a special lubricant best qualified for the purpose and in sufficient quantity for years of service without danger of loss during installation, removals and reapplications of the coupling.

Various changes may be made in the invention hereinabove specifically described without departing from or sacrificing the advantages of the invention as defined in the appended claim.

We claim:

In a coupling for operation between spaced ends of substantially aligned shafts and including flexibly interconnected driving and driven hub members and collar means for releasably attaching said coupling to and between the shaft ends without axial displacement of the shafts, the combination comprising: a pair of collars respectively mountable on said shaft ends and each having an end portion forming a seat for an adjacent hub member; means extending through said collars for releasably securing said hub members thereto; each of said hub members having an imperforate cross-section; a lubricant retainer housing encircling said hub members in sealing relationship with a portion of the outer peripheries thereof, and joining said hubs unitarily to form with the imperforate cross-sections of the hubs a lubricant chamber, whereby lubricant is retained when the coupling hubs are removed from the aforesaid shafts.

References Cited in the file of this patent

UNITED STATES PATENTS

| | | |
|---|---|---|
| 1,379,962 | Chilton | May 31, 1921 |
| 2,181,537 | Schmitter | Nov. 28, 1939 |
| 2,200,641 | Ricefield | May 14, 1940 |